(12) United States Patent
Haffner et al.

(10) Patent No.: US 10,844,301 B2
(45) Date of Patent: Nov. 24, 2020

(54) METHOD FOR PRODUCING A SYNTHESIS GAS

(71) Applicant: Haffner Energy, Vitry le Francois (FR)

(72) Inventors: Philippe Haffner, Vitry le Francois (FR); Alain Fernandez De Grado, Les Rivieres Henruel (FR)

(73) Assignee: HAFFNER ENERGY, Vitry le Francois (FR)

( * ) Notice: Subject to any disclaimer, the term of this patent is extended or adjusted under 35 U.S.C. 154(b) by 144 days.

(21) Appl. No.: 15/773,345

(22) PCT Filed: Nov. 4, 2016

(86) PCT No.: PCT/FR2016/052866
§ 371 (c)(1),
(2) Date: May 3, 2018

(87) PCT Pub. No.: WO2017/077253
PCT Pub. Date: May 11, 2017

(65) Prior Publication Data
US 2018/0320094 A1 Nov. 8, 2018

(30) Foreign Application Priority Data

Nov. 4, 2015 (FR) .................................. 15 60557

(51) Int. Cl.
*C10J 3/66* (2006.01)
*C10K 1/02* (2006.01)
(Continued)

(52) U.S. Cl.
CPC .................. *C10J 3/66* (2013.01); *C01B 3/02* (2013.01); *C10K 1/02* (2013.01); *C10K 1/04* (2013.01);
(Continued)

(58) Field of Classification Search
CPC ..... C10K 1/02; C10K 1/04; C01B 3/02; C10J 2300/0916; C10J 2300/1884
See application file for complete search history.

(56) References Cited

U.S. PATENT DOCUMENTS 3,954,384 A * 5/1976 Tyler ....................... F23N 5/027
431/47
5,378,323 A * 1/1995 Fransham ................. B09B 3/00
201/23

(Continued)

FOREIGN PATENT DOCUMENTS

DE      43 42 165 C1     5/1995
EP      2 589 646 A1     5/2013

OTHER PUBLICATIONS

J. L. Heij, "Pyrolyse en vergassen", Kunststof en Rubber, No. 1, 1993, p. 19-21; 7 pgs. with partial machine generated English-language translation.

(Continued)

*Primary Examiner* — Paul A Wartalowicz
(74) *Attorney, Agent, or Firm* — Maier & Maier, PLLC

(57) ABSTRACT

A method for producing a synthesis gas from an organic material with a moisture content of less than 20%. A first step for carrying out the thermolysis of the organic material and a second, separate step for the gasification (ii) of the thermolysed organic material. The thermolysis step is carried out by increasing the temperature of the raw material up to an end temperature higher than 150° C. and lower than 1400° C.; —the thermolysis step (i) is carried out in a controlled gas atmosphere in which the quantity of oxygen supplied is less than 20% of the quantity of oxygen required for the stoichiometric combustion of the organic raw material; —the thermolysis gas obtained in the thermolysis step is conveyed to a purification step (iii) for removing undesirable elements.

14 Claims, 1 Drawing Sheet

(51) Int. Cl.
*C10K 1/04* (2006.01)
*C01B 3/02* (2006.01)
(52) U.S. Cl.
CPC .................. *C10J 2300/0916* (2013.01); *C10J 2300/1884* (2013.01); *Y02P 20/145* (2015.11)

(56) References Cited

U.S. PATENT DOCUMENTS

| | | | | | |
|---|---|---|---|---|---|
| 5,571,294 | A | * | 11/1996 | Ferges | ....................... C10J 3/84 48/128 |
| 5,728,196 | A | * | 3/1998 | Martin | ..................... B03B 9/04 201/17 |
| 6,024,226 | A | * | 2/2000 | Olivier | ..................... B03B 5/30 209/172.5 |
| 2004/0011484 | A1 | * | 1/2004 | Saviharju | ............. D21C 11/063 162/47 |
| 2005/0115674 | A1 | * | 6/2005 | Taguchi | .................. F23G 7/065 156/345.29 |
| 2007/0261303 | A1 | * | 11/2007 | Surma | ..................... B09B 3/005 48/197 R |
| 2009/0218209 | A1 | * | 9/2009 | Poulleau | .................. B09B 3/00 201/10 |
| 2012/0080647 | A1 | * | 4/2012 | Zhao | .......................... C10J 3/66 252/373 |

OTHER PUBLICATIONS

International Search Report and Written Opinion dated Mar. 21, 2017 in corresponding International Application No. PCT/FR2016/052866; 15 pgs. with partial English-language translation.

International Preliminary Report on Patentability dated Sep. 25, 2017 in corresponding International Application No. PCT/FR2016/052866; 10 pgs.

* cited by examiner

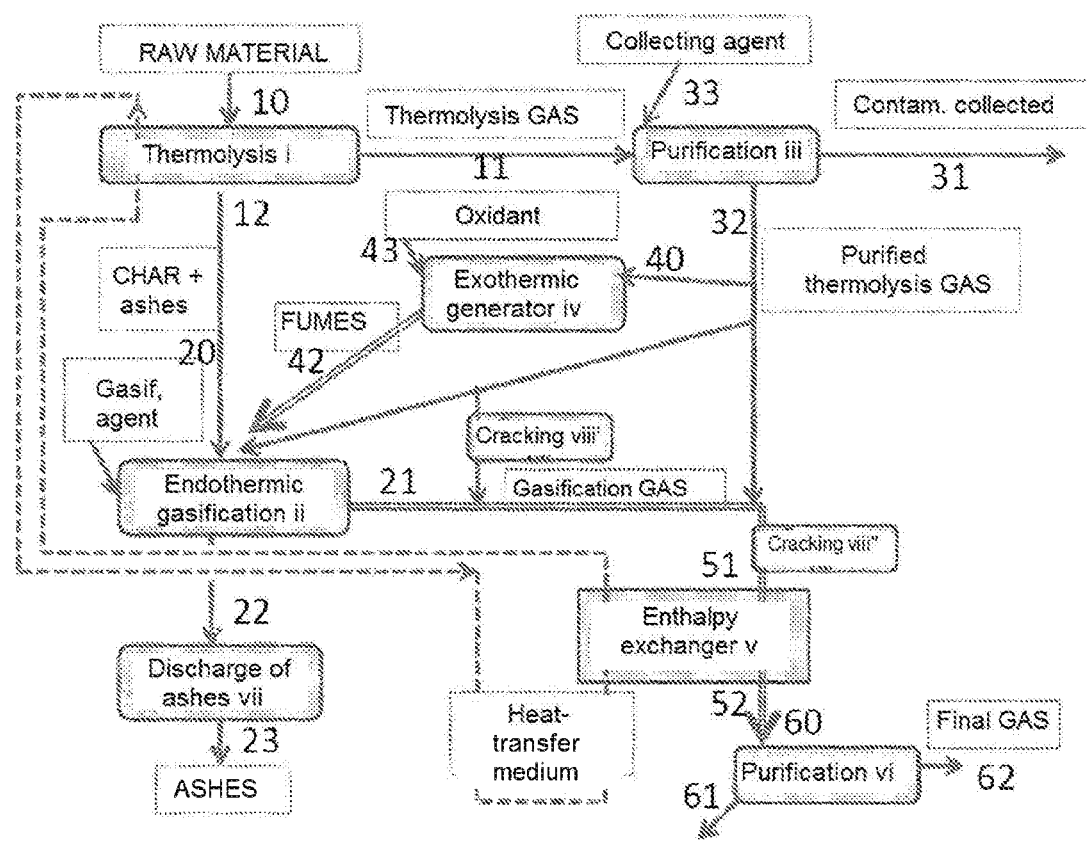

METHOD FOR PRODUCING A SYNTHESIS GAS

FIELD OF THE INVENTION

The invention relates to the field of the production of gas by the thermolysis of organic material used in a solid or liquid form, this material being able to consist of biomass of mainly plant or animal or fossil origin, such as for example plastics or other products composed of hydrocarbons.

The invention relates in particular to a method for producing gas and the installation for producing gas from organic material using said method.

BACKGROUND

Gasification of the organic material is one of the possible methods for the energy reprocessing thereof, the other methods being combustion and methanisation.

The organic material always mainly consists of molecules composed of carbon C, hydrogen H and oxygen O, possibly combined with water $H_2O$. If this organic material is subjected to a temperature above 150° in the absence of oxygen, it then undergoes a transformation known as pyrolysis, which breaks down the carbon molecules by rupture of the covalent bonds. The products obtained during this pyrolysis are solids (mineral ash plus residual carbon known as char), vapours that condense at ambient temperature and pressure (tars, oils) and synthesis gases, known as syngases, which remain in the gaseous state at ambient temperature and pressure (carbon monoxide, dihydrogen and gaseous elements that cannot be reprocessed economically, such as carbon dioxide).

The char produced by pyrolysis also undergoes gasification by the association of carbon with oxygen and hydrogen, which produces carbon monoxide, dihydrogen and methane under ideal conditions. This reaction is endothermic and requires a specific addition of heat. Traditionally, this addition is provided by a combustion reaction in the air produced in the process.

Ideally, the products of the process should be solely carbon monoxide, dihydrogen and methane. In reality, depending on the origin of the raw material, its purity and the reaction conditions (pressure, temperature, speed, etc.), elements obtained by chemical recombination with certain elements, and in particular chlorine, sulphur, nitrogen, etc., appear and are elements that are undesirable for their effects of corrosion, abrasion and fouling of the equipment. In addition, other elements such as dioxins and furans may be produced during the reactions, representing a high risk to the health of surrounding populations.

According to the prior art of organic material gasification processes, the production of syngas has recourse to mainly three technologies:

In a process of the co-current or counter-current type with so-called slow pyrolysis, the raw material is introduced into a chamber in which it undergoes the pyrolysis and gasification steps during its movement. Air or oxygen is introduced locally into the chamber in order to allow partial combustion of the char and to generate the energy necessary for the endothermic gasification, in particular because of the concomitant presence of water. The gases produced are extracted either at the entry for the raw material (counter-current logic) or at the discharge for the ash (co-current logic).

In a method of the fluidised bed type with so-called rapid pyrolysis, the raw material is previously ground and calibrated and then introduced into a reactor, where a mass of particles is agitated at more than 500° C., for example sand or olivine or dolomite. The raw material attacked by a rapid gasification front then undergoes, in a few fractions of seconds, the pyrolysis and gasification steps. The gases produced are collected in a single main outlet placed in a high position. The following step, in the majority of cases, effects a centrifugal separation of the gases produced with the sand. The latter is then recirculated to the reactor in order to be reused, entraining with it the majority of the non-gasified char particles.

In a method of the rotary drum type, the raw material is introduced into a rotary drum, the chamber of which is heated on the external envelope. The gases produced are discharged at the other end. The progression of the material is provided by the free rotation movement in the drum. The gases produced are collected in a single main outlet.

These traditional solutions have in particular the following defects:

The syngases produced by these various processes are deemed to have low energy with a net calorific value NCV that is often below 5 $MJ/Nm^3$.

The pyrolysis and gasification reactions that take place in the same chamber do not make it possible to precisely control the temperatures and chemical compositions of the reagents present in the various zones of the reactor. The composition of the final gas is affected unfavourably thereby, in particular through the possible presence of tars, nitrogen oxides, dioxins, etc.

In the case of rapid pyrolysis by fluidisation, which is carried out instantaneously with the two pyrolysis gasification operations, the product gas is of much better quality. However, the installation is complex, expensive and greedy of energy since it is necessary to provide the fluidisation of heavy sandy elements and the circulation of the sand is subject to blockages, which reduces the degree of availability of equipment. In addition, it is not possible to exploit the enthalpy of the gases produced, the temperature of which is generally of 800° C., in order to supply the upstream process, and this enthalpy is therefore lost for the method, involving a loss of efficiency that may exceed 20%.

Moreover, discharging the ash from the gasification is complex since some raw materials have a melting point of the ash that is fairly low (850° C. for example for maize cob), which means that, if the raw-material resource changes nature, the ash is then sometimes solid, sometimes viscous, sometimes liquid. The current solution is to very greatly restrict the exploitation of raw materials with ash with a melting point below the internal temperature of the walls of the gasification reactor, which limits the opportunity of supply of certain competitive raw materials with a high calorific value. This concerns for example the majority of agricultural waste, such as maize cobs.

The need to eliminate the tars for exploitation of syngas in an engine, for example, makes it necessary to heat the syngas to a temperature close to or above 1000° C., and the conventional processes do not make it possible to recover the heat energy transmitted to the syngas for the gasification method. This recovery is generally possible and effective only for the supply of an alternative method of the Rankine cycle type supplying a steam turbine.

The use of air taken from the atmosphere in order to provide the addition of oxidant during a combustion step integrated in a conventional process causes the production of lean syngas (usually less than 5 MJ/Nm$^3$) with a nitrogen content exceeding 40%.

The traditional methods of pyrolysis and/or gasification based on a fixed bed or fluidised bed have the major drawback of producing mixed gases that it is not possible to reprocess separately. The gases issuing from pyrolysis have a composition distinct from that of the gases issuing from gasification proper. However, since the two steps are carried out simultaneously in these traditional processes, it is impossible to separate said gases, which has numerous drawbacks, as described later.

The function of pyrolysis is to provide the rupture of the covalent bonds of the carbon chains under the effect of high temperature (typically 300° to 800° C.) in the absence of outside oxygen (or oxygen greatly lacking with respect to the theoretical stoichiometric proportions).

The function of gasification is to provide the production of CO from fixed carbon extracted from the char obtained after total pyrolysis, with the addition of an oxidising or gasifying agent such as $H_2O$ or $CO_2$ and heat.

These are therefore not the same thermochemical reactions that take place; moreover, the first reaction is weakly endothermic whereas the second is on the other hand highly endothermic.

In a fixed co-current bed, the material being transformed and the gases produced descend together, which means that the pyrolysis and gasification gases are mixed and that they all leave at the bottom without it being possible to separate them. There is advantageously a phenomenon of cracking of the tars present but the two gas productions (pyrolysis and gasification) are cracked together, which represents a high volume of gas to be processed and the final temperature after cracking remains very high (typically between 600° and 1000° C.). Thus in this type of process the energy represented by the sensible heat of the gases produced cannot easily be reused by internal recirculation in the same process, for example in order to allow endothermic reactions. This is because the high temperatures involved complicate the choice of technical solutions (expensive refractory steels, etc.).

In a fixed counter-current bed, the pyrolysis and gasification gases leave mixed at the top whereas the material descends. This counter-current flow makes it possible to bring out the cooled gases through their passage through the descending raw material and therefore to reheat this descending material, which is favourable to the internal recirculation of the energy of the gases produced. However, because of this recirculation, some of the material passed through is then pyrolysed at a temperature very much lower than that required for the cracking of the tars. Thus many primary, secondary and tertiary tars remain, to the detriment of the subsequent reprocessing of the product gas.

In a circulating and boiling fluidised bed, all the gases are produced almost simultaneously in the same chamber (in accordance with the flash pyrolysis process) and are therefore mixed. The heat attained is high (approximately 900° C.) and homogeneous because of the strong gaseous agitations present, which limits the production of tars. However, all the gases produced are at very high temperature, which again is not easy to recycle internally for supplying the process.

In an entrained bed, the powdery elements to be pyrolysed and gasified are injected at the top part of the reactor in a mixture with the oxygen and steam required for supplying the gasification reaction, which is then done at a temperature generally above 1200° C. In the same way as fluidised beds, the recycling of the enthalpy of the gases produced is very complex to implement.

Furthermore, the traditional solutions are subject to rapid corrosion of the equipment, including at temperatures above the possible condensation temperature of acids. This hot corrosion appears for example above a temperature of 50° C., where hydrochloric acid causes a very rapid corrosion of the materials.

This considerably limits recourse to certain inputs, but also reduces the ranges of use of high-temperature heat exchangers, and the thermal pinch thereof is often very high. Thus highly halogenated inputs (waste containing PVC, some agricultural waste, animal-farming effluent, etc.) are at the present time proscribed in traditional gasification processes because of an excessively high chlorine level. The energy exploitation of these inputs is currently reserved for other energy channels having an energy efficiency that is generally less high than gasification, for example incineration or methanisation.

In addition, a risk of fouling deposits on the walls of the traditional equipment may also arise with certain raw materials containing a great deal of alkaline components (K, Na, etc.) and lead to fouling of the equipment, to a rapid drop in the performance of the heat exchangers, or even to a stoppage of the equipment. The interfering materials are for example tree leaves, maize cob, wheat straw, and the majority of straw issuing from cereals. In the majority of cases, it is the presence of alkalis (K and Na) behaving as fluxes beyond temperatures of 600° C. that cause the accumulation of clinker and the consequent fouling of the exchangers at high temperature.

Finally, the traditional solutions compensate for their difficulties in recycling the sensible heat energy present in the gases produced (risks of corrosion, fouling in the heat exchangers at very high temperature, etc.) by consuming just a large part of said gases in order to provide by combustion the energy necessary for the maintenance of the endothermic reactions of the process. Thus the total energy balance of the process is reduced.

There is also known, from the document DE 4342165 C1, a method for producing synthesis gas from organic material comprising a first step of thermolysis of said organic material and a second separate step of gasification of the thermolysed organic material. The thermolysis product gas during the first step is burnt without prior purification in the step of gasification of the thermolysed organic material. In this process, only the end gas undergoes a purification step.

SUMMARY

The aim of the present invention is to overcome the drawbacks of the prior art by proposing an economical method capable of producing syngas of much better quality than that obtained with pyrolysis according to the prior art. In addition, this process makes it possible to improve the global energy efficiency as well as the service life of the equipment.

Thus the present invention relates to a method for producing a synthesis gas from an organic material with a moisture content of less than 20%, comprising a first step of thermolysis i of said organic material and then a second separate step of gasification ii of the thermolysed organic material, remarkable in that:
- the thermolysis step i is carried out by increasing the temperature of the raw material to an end temperature higher than 150° and lower than 1400° C.,
- the thermolysis step i is carried out in a controlled gas atmosphere in which the quantity of oxygen supplied is less than 20% of the quantity of oxygen required for the stoichiometric combustion of the organic raw material,
- the thermolysis gas obtained during the thermolysis step i is sent to a step iii of purification of the undesirable elements,
- the thermolysed material is sent to a step ii of endothermic gasification at a temperature above 800° C. for obtaining a gasification gas,
- the gasification gas undergoes an enthalpy recovery step v so that its temperature is below 500° C.,
- more than 35% of the energy necessary for the thermolysis step i is supplied by said enthalpy recovery step v.

According to a preferred embodiment of the invention, all or part of the purified thermolysis gas undergoes the endothermic gasification step ii.

According to a preferred embodiment of the invention, all or part of the purified thermolysis gas is mixed with the gasification gas upstream of the enthalpy recovery step v.

According to a preferred embodiment of the invention, all or part of said purified thermolysis gas undergoes a cracking step and is then mixed with the gasification gas upstream of the enthalpy recovery step v.

According to a preferred embodiment of the invention, all or part of said purified thermolysis gas is mixed with the gasification gas and then undergoes a cracking step upstream of the enthalpy recovery step v.

According to a preferred embodiment of the invention, all or part of the purified thermolysis gas undergoes a combustion step iv supplying energy to the endothermic gasification step ii. Even more preferably, the oxidant allowing the separate combustion of all or part of the purified thermolysis gas is oxygen-enriched air. Entirely preferably, dihydrogen is added to said oxidant so that the combustion fumes produced contain water vapour.

According to a preferred embodiment of the invention, the temperature at which the thermolysis step i is carried out is between 300° C. and 1400° C.

According to an even more preferred embodiment of the invention, the temperature in which the thermolysis step i is carried out is between 300° C. and 800° C.

According to an entirely preferred embodiment of the invention, the temperature at which the thermolysis step i is carried out is between 400° C. and 800° C.

According to a preferred embodiment of the invention:
the thermolysis step i is carried out in two steps in series, a first thermolysis step i' at a temperature of between 250° C. and 350° C. and a second thermolysis step i" at a temperature of between 650° C. and 750° C., and the gases issuing from each of these steps i', i" being extracted separately and undergoing a conjoint or separate step iii of purification of the undesirable elements.

According to a preferred embodiment of the invention, the thermolysis step i is carried out in a chamber and the thermolysis gases undergo a retention time in the thermolysis chamber of less than 5 seconds.

According to a preferred embodiment of the invention, the purification step iii comprises a step of purification of dust after mixing with one or more agents for collecting undesirable elements.

According to an even more preferred embodiment, said collecting agent is lime.

According to a preferred embodiment of the invention, the purification step iii comprises a condensation operation.

According to a preferred embodiment of the invention, the method comprises a prior step of drying the organic material in order to adjust its moisture level compatible with the thermolysis step i.

According to a preferred embodiment of the invention, the purified thermolysis gas is used in whole or in part as a main or supplementary heat-transfer medium during the enthalpy exchange step v.

According to a preferred embodiment of the invention, independent solid particles are used wholly or partly as a main or supplementary heat-transfer medium during the enthalpy exchange step (v).

According to a preferred embodiment of the invention, the quantity of the elements Cl, S, Na and K in the materials treated and/or the gases produced is analysed at step i of the method.

According to a preferred embodiment of the invention, the quantity of the elements carbon, hydrogen and oxygen, referred to as CHO elements, in the materials treated and the gases produced is analysed at all or some of steps i, ii, iii, iv and v of the method.

The advantage of the invention is that the method optimises the quality of the product gas by best staging the various steps of the method so as to limit the contamination of the products with each other, in particular by undesirable compounds such as chlorinated elements or tars.

This thus makes it possible to produce a syngas of very good quality, the net calorific value of which is generally greater than 8 MJ/Nm$^3$, the total carbon monoxide and dihydrogen content of which is greater than 70%, and the tar content of which is less than 50 mg/Nm$^3$.

Thus a separation of the production by thermolysis and gasification is provided. The thermolysis is intentionally conducted at a temperature below that of the gasification and in the absence of oxidant so as to preserve a controlled fraction of char at the end of this first step, said char being intended to be gasified during the subsequent gasification step.

In addition, the thermolysis gases undergo specific purification in addition to any final filtration of the process. Its economic cost is high since it is comparable to the installation of a double filtration in series on the total and final gases, or even a double filtration in cascade of the same total of gases, whereas these thermolysis gases relate to only a part of the total gas (on average 60%), these last two solutions then appearing to be more advantageous since they process the total gas while avoiding the risks of bypass of the contaminants being retained. In addition, the high temperatures generally make it possible to use ceramic filters or one made from a material making it possible to work at high temperatures, more expensive than the generally offered filters made from polytetrafluoroethylene. Thus this prefiltration does not a priori afford any specific advantage that is obvious to a person skilled in the art.

The advantage, however, of this purification is that it makes it possible to specifically discharge the chlorine present in the thermolysis gas in order to greatly increase the ratio of sulphur with respect to chlorine in the total gas issuing from the process when it passes to the cracking stage at very high temperature (typically 900° to 1250° C.). The higher this ratio, the lower are the risks of hot corrosion. For example, a molar ratio of 2S/Cl>8 will make it possible to obtain a very much reduced risk of corrosion.

Thus, by virtue of the method according to the invention, the 2S/Cl molar ratio can be controlled and no longer suffered, in order to reduce the corrosive risk. The preliminary purification of the thermolysis gases makes it possible to preferentially eliminate the chlorine (typically 60% of the chlorine present in the input is eliminated at a temperature of 400° C. and 80% at 600° C.) with respect to the sulphur (in $H_2S$ form) because of volatilisation of the chlorine at the thermolysis stage.

BRIEF DESCRIPTION OF THE FIGURE

Other features and advantages of the invention will emerge from the following detailed description of the non-limitative embodiments of the invention, with reference to the accompanying FIGURES, in which:

FIG. 1 shows schematically the method according to a variant of the invention.

DETAILED DESCRIPTION

The raw material that is targeted by the invention is typically, but not exclusively, biomass or domestic waste. Among the difficulties that it is necessary to overcome, several elements can be noted:

Biomass has a composition that is obviously very variable but is in particular characterised by the presence of often high moisture. For example the moisture present in fresh forestry chips is generally greater than 35%. This moisture is defined by the ratio between the mass of water contained in the moist material and the residual mass of the anhydrous dry material after drying in a ventilated-air stove at a temperature of 103° C.±2° C. However, the presence of excess water in the process assists the formation of oxidised compounds such as carbon dioxide to the detriment of syngas. It is necessary to control the moisture level of the raw material, and therefore indirectly to control the quantity of water that enters the system with the raw material.

In addition, biomass often contains alkaline elements such as potassium. This element has the property of lowering the melting point of the ash, values below 850° C. regularly being observed, which interferes with the discharge of the ash, which melt in an uncontrolled fashion and stick to the walls of the equipment, leading to its gradual fouling and to the disturbance of the heat exchangers. It is necessary to control the behaviour of the ash, either by ensuring that it remains powdery without melting, or by ensuring that it melts permanently. A random intermediate solution is not tenable industrially.

In the case of domestic waste, it is usual to encounter plastics containing chlorine. This element has the defect of vaporising at very low temperature (at least than 200° C.) and of combining with the hydrogen present in the process, thus providing the production of hydrochloric acid HCl in gaseous form. The presence of hydrochloric acid greatly contributes to the accelerated corrosion of the great majority of metals, including austenitic metals, in particular at temperatures above 650° C.

In general terms, the invention proposes to proceed with a production of synthesis gas mainly containing carbon monoxide and dihydrogen. Preferably, this proportion will be at least 50% of the gaseous composition of the end product. Even more preferably, this proportion will be at least 85% of the final gaseous composition.

As shown in FIG. 1, the general method comprises a thermolysis step i supplied with raw material 10 and during which the flow of thermolysis gas 11 is extracted and separated from the flow of thermolysed material 12. The flow of thermolysed material 12 is next subjected to a gasification step ii at the end of which the flow of gasification gas 21 is extracted. The residual gasified material 22 is composed of mineral ash and is discharged during the ash-discharge step vii.

The untreated thermolysis gas 11 extracted from the thermolysis step i is next subjected to a purification step iii so as to eliminate undesirable elements therefrom and thus forms a purified thermolysis gas 32.

Advantageously, it then partially or completely undergoes the gasification step ii, thus accompanying the flow of thermolysed material 12 In this case, the advantage of having previously purified this thermolysis gas 11 limits the creation of chlorinated or sulphurated elements that could interfere with the process.

The proportion of purified thermolysis gas 32 not sent to the gasification step ii is mixed with the gasification step 21 and the mixture is next subjected to an enthalpy recovery step v and then a final purification step vi before becoming the product syngas 62.

The steps are described separately in order to facilitate understanding thereof. However, in the context of a device implementing the method, a plurality of steps may take place in the same equipment, provided that the transformations undergone by the material respect the succession imposed by the method.

In addition, the method according to the invention is designed as a closed method for the carbon element in gaseous form, that is to say the entry point for carbon is the entry for raw material 10 and the exit point is the exit for product syngas 62. The elements that emerge from the process through other branches of the process are solid or liquid rejects, containing less than 3% carbon.

The more detailed description of the succession of steps of the method is as follows:

The thermolysis according to the invention is a step of transformation of the carbonaceous material by reduction of the length of the carbon chain under the effect of a temperature above 150° C., with a shortage of gaseous oxygen and on a relatively dry raw material.

The purpose of the temperature of at least 150° C. and less than 1400° C. is to volatilise the light elements associated with the raw material. The condensable vapours obtained contain in particular water and light oils. Gas is also created, such as carbon monoxide.

Preferably, the thermolysis is carried out at a temperature of between 300° C. and 1250° C. The purpose of functioning at 300° C. is to evaporate the lightest components and to maximise the quantity of carbon that is sent to the gasification step. The advantage is to concentrate mainly on the purification of the light volatile elements such as chlorinated compounds. Functioning at 1250° C. conversely meets the objective of producing the purest char possible while ensuring the release of all the elements that have a lower vaporisation temperature, even if it means volatilising part thereof to the thermolysis gas outlet.

More preferably, the thermolysis is carried out at a temperature of between 300° C. and 800° C.

Even more preferably, the thermolysis is carried out at a temperature of 350° C. and 560° C. Thus, firstly, the tar that is volatilised beyond 600° C. cannot contaminate the thermolysis gas. Secondly, the temperature of the walls of the thermaliser remains below the critical temperatures for corrosion by acid gases.

The purpose of the lack of gaseous oxygen is to limit the oxidation of the volatilised elements. In particular the quantity of gaseous oxygen present in the chamber in which the thermolysis takes place is advantageously adjusted so as to guarantee that it remains below 20% of the quantity of oxygen required for providing stoichiometric, and therefore perfect, combustion of the organic raw material present in the chamber. Only this lack of oxygen guarantees that no parasitic combustion of the raw material takes place, which would have the effect of creating carbon dioxide and consuming carbon, then not reprocessed by the method.

This limitation of the quantity of oxygen in the thermolysis chamber requires the use of a thermolysis device that is sufficiently sealed for the gaseous exchanges with the external environment through which the raw material arrives or where the thermolysis products leave not to allow the entry of oxygen in an uncontrolled fashion. For example, the raw-material feed will comprise an airlock device with two airtight valves functioning in alternation.

Conversely, a continuous and total lack of oxygen is not industrially credible and uncontrolled fluctuation in the quantity of oxygen present is more representative of reality. In order to be free from an excessively great variation in behaviour during the thermolysis in the eventuality of an uncontrolled variation in the quantity of oxygen, it is advantageous to have a method for regulating the level of oxygen in the chamber, in order to guarantee a presence of oxygen that is as low as possible. Preferably, the amount of oxygen must remain between 1% and 10% of the value allowing total stoichiometric combustion of the material present. More preferably, the range is between 2% and 5% oxygen.

Advantageously, a solution for the regulation of the level of oxygen may be obtained by the injection of product syngas, so that the carbon monoxide captures the oxygen and produces carbon dioxide without any effect on the reaction, and/or so that the hydrogen captures the oxygen and produces water.

The oxygen present in the chamber may be measured by means of measurement sensors placed directly in the thermolysis chamber, or placed at the gas or material inlets and outlets of the chamber, so as to determine by deduction the oxygen flows that circulate therein. This indirect method makes it possible to reduce the temperature to which the sensors are subjected.

More broadly, any sort of oxygen-level regulation obvious to a person skilled in the art and preserving the efficiency of the method or the quality of the gases produced can be envisaged.

The material must be fairly dry, that is to say its moisture level, defined by the ratio between the mass of water contained in the material in the moist state and the dry mass of this anhydrous material, must be less than 20% when it is subjected to the thermolysis step i.

"Thermolysis step" means being subjected to a suitable temperature as described above and also capturing and discharging the gases emitted in the form of thermolysis gas. Thus a device that would perform this thermolysis step among other prior actions such as for example drying or grinding of the raw material is indeed a device that applies the thermolysis as described by the invention.

This constraint of maximum moisture makes it possible to reduce the enthalpy consumption necessary for raising the temperature of the raw material, in particular the enthalpy corresponding to the vaporisation of the liquid water introduced with the raw material.

It also makes it possible to minimise the consumption of carbon during the thermolysis through the presence of excess water in the process, causing the production of carbon dioxide to the detriment of syngas.

However, the moisture must also not be too low or variable in an uncontrolled fashion since this may destabilise the chemical reactions.

Thus, preferably, the amount of moisture must be above 5% and below 15%, and even more preferably be above 8% and below 10%.

It is also preferable to use regulation of the moisture of the raw material at the inlet in the thermolysis step with specific capture of the water vapour, for example by means of a low-temperature belt dryer.

The duration and/or temperature of the thermolysis step i are preferably regulated so as to obtain a $2S/(Cl+Na+K)$ molar ratio, in the thermolysed material, of above 2, even more preferentially above 4 and entirely preferentially above 8.

The quantity of the elements S, Cl, Na and K present in the chamber may be measured by means of measurement sensors placed directly in the thermolysis chamber, or placed at the gas or material inlets and outlets of the chamber, so as to determine by deduction the qualities present.

Thus the chlorinated and alkaline elements (potassium, sodium, in particular in its NaCl form) may themselves be extracted selectively by management of the thermolysis temperature in order to vaporise these elements specifically. Thus the risks of deposition of these elements are reduced as well as the influence of these alkalis on the hot-corrosion phenomenon.

At the end of the thermolysis i, the solid material contains mineral ash, char or pure carbon and possibly carbon chains that have not been reduced because the maximum temperature of the thermolysis has not been sufficient.

The gasification step ii then makes it possible to terminate the reduction of the carbon chains and also to transform the carbon-char into carbon monoxide. This reaction is obtained by means of the addition of a gasification agent of the $H_2O$ or $CO_2$ type for example and by means of the exposure of the material to a temperature of more than 800° C.

Preferably, the gasification is carried out at a temperature above 1000° C., and more preferably at a temperature of more than 1200° C.

Gasification is an endothermic reaction that requires an addition of heat energy.

According to a variant of the invention, this addition of energy is provided by an additional heat-energy generation step iv by a process of combustion of part of the purified thermolysis gas 32 or of the gasification gas 21 with an oxidant added such as air or oxygen, the combustion of which generates hot fumes having a temperature of more than 800° C. and which is injected at the inlet of the gasification step in order to add all or some of the energy required. It is preferable to minimise the dilution by the nitrogen of the air during this combustion, for example by using as an oxidant an oxygen-enriched air, the oxygen level of which is above 40%, or more preferably above 60%.

According to another variant of the invention, the addition of heat and energy can be done by a specific step of combustion of hydrogen with oxygen. The advantage of this solution is that the addition of nitrogen becomes negligible and that this highly exothermic reaction makes it possible to easily raise the gasification temperature beyond 1200° C., the adiabatic temperature of the flame issuing from the combustion of $H_2+O_2$ being 3200° C. In addition, the combustion of hydrogen and oxygen makes it possible to produce water, which then serves as a gasification agent.

According to another variant of the invention, the addition of heat energy can be done by means of the use of electric heating means, disposed in the equipment performing the gasification step ii, either as the main addition of the energy required by the endothermic reaction, or as a supplement to the addition of one of the solutions described above. The impact of this electrical consumption on the economic balance of the method may prove to be favourable if the product syngas is reprocessed by an electrical production with an efficiency greater than 42%, such as that obtained by the use of an explosion engine or a combined cycle using a gas turbine and a steam turbine. Then the proportion of the electricity consumed is compensated for by the saving on fuel during the combustion step iv, but also by the saving on certain electrical auxiliaries otherwise required, in particular for the production of oxygen by membrane separation.

At the end of the gasification step ii, the ash is advantageously discharged from the process by a discharge step vii. If the raw material, for example annual plants, contains elements favouring the appearance of ash melting below 850° C., in particular potassium, then it may be preferable to promote this melting by the addition of melting elements, for example at the gasification step ii, so that the ash is discharged in liquid form of the gasification step ii in order next to be cooled and vitrified during the discharge step vii.

According to the invention, the thermolysis gas is preferentially extracted from the thermolysis at a sufficient temperature to extract from the raw material volatile vapours that have a vaporisation temperature of between 300° C. and 800° C. In particular it is a case of collecting and extracting from the thermolysis gas flow the compounds based on chlorine and sulphur, the evaporation temperature of which is below 300° C. To this end, a collecting agent of the activated carbon or lime type is introduced into the gaseous stream and mixed intimately therewith, so as to allow the collection of the targeted vapours. Next this gas containing collecting agent is filtered in a dust filtration means such as a cyclone and/or an electrofilter and/or a bag filter and/or a ceramic cartridge filter; so that the connecting agents are discharged from the gas stream in the form of the collected-contaminants discharge 31. The purified thermolysis gas 32 is then available for undergoing other steps.

Thus, according to a preferred embodiment of the invention, said purification step ii comprises the mixing of said thermolysis gas with lime at a temperature between 300° and 350° C. and preferentially between 320° and 340° C.

The thermolysis gas obtained during the thermolysis step i is sent alone to the step iii of purification of the undesirable elements. In the context of the present invention, the term "the thermolysis gas obtained during the thermolysis step i is sent alone to a step iii of purification of the undesirable elements" is intended to signify that the thermolysis gas is sent directly to the purification step iii without undergoing any prior chemical modification and not being mixed with another gas and in particular not with a gasification gas. This term is intended in particular to signify that said thermolysis gas is sent to a step iii of purification of the undesirable elements before optionally undergoing the endothermic gasification step ii.

According to a preferred embodiment of the invention, all the thermolysis gas obtained during the thermolysis step i is sent alone to a step iii of purification of the undesirable elements.

This purification makes it possible to accumulate several decisive advantages:

The sensitivity of the exchangers to accelerated corrosions at high temperature being greatly to very greatly reduced, the exchange temperatures can be substantially raised and the performance of the exchangers (reduction in thermal pinch) improved. The result is better recycling of the enthalpy, and recovery of energy at higher temperatures.

The reduction in prefiltration of the level of alkalis makes it possible to raise the melting point of the ash, and to prevent the formation/accumulation of clinker.

During this purification step, it is possible for a parasitic condensation to appear, in particular if some walls of the means of mixing the collecting and filtration agents are said to be cold and cause cooling of the gas below its dew point. This risks making condensates of hydrochloric acid or other acids appear, liable to corrode the walls of the equipment. In order to prevent this situation, it is advantageous to associate, with the device making it possible to provide this thermolysis gas purification step, an internal heating means and/or preheating of the collecting agents and/or heat insulation of the walls of the equipment involved, in order to ensure that the thermolysis gas 11 to be purified cannot be cooled excessively during its purification and reach its dew point.

According to a variant of the invention, this dew point is on the other hand sought, in a specific condensation step. During this step, the gas circulates in a condensation means supplied with cold fluid, that is to say at a temperature below that of the gas, so that condensation of the vapours condensable at the temperature sought appears. The material chosen for this condensation means is obviously compatible with any hydrochloric acid that may appear, or any other aggressive product. The condensates are then extracted from this means and processed specifically in order to neutralise their dangerousness.

The step iii of purification of the thermolysis gas followed optionally by a final filtration vi of the total gases (thermolysis gas+gasification gas) makes it possible to envisage a differentiated system for processing ashes, these being of very different natures. This has the advantage of optimised processing and dumping costs.

The char that is intentionally not transformed in the first step may undergo desorption of the absorbed volatile elements, as well as disaggregation to the powdery state that greatly accelerates the penetration of the gasification front, without requiring the high consumption of energy of a fine grinding of the untreated incoming materials, in particular lignocellulosic ones (unlike the fluidised bed, which requires finely ground and calibrated incoming materials, which represents a very significant energy and economic cost).

The better property of these gases obtained makes it possible to improve the thermal pinch of the heat exchangers necessary for the recovery of the heat contained in the gases. Thus the pinch may be below 50° C. instead of the normal 150° C.

The better performance of the internal recirculation of the enthalpy of the gases, with ideally an outlet temperature of the final gases at a temperature below 400° C., very greatly limits the consumption of external energy or the autoconsumption of part of the product gas. This is because the energy available at the output of the process is reused internally upstream. The hot gases provide the energy necessary both for ensuring thermolysis while ensuring preheating of the gases at the entry to the final cracking step.

The problematic raw materials (agricultural substrates, leaves, maize cobs, PVC, etc.) can finally be reprocessed with very good energy efficiency by virtue of the invention.

According to a variant of the invention, the gasification gas and the thermolysis gas must undergo a cracking reaction in order to transform the tar contained in the gas into shorter carbon chains that disturb the functioning less. To this end, the gas preferentially undergoes at least one residence time greater than 1 second at an ambience of more than 880° C.

According to the different variants of the invention, the following cases are in particular possible:

If a gas undergoes a combustion step iv, it is considered to be processed if the combustion is carried out at more than 880° C.

If a gas undergoes a gasification step ii, it is considered to be processed if the gasification is carried out at more than 880° C.

If the purified thermolysis gas 32 is mixed with the gasification gas 21 and the temperature of the whole reaches more than 880° C. for more than 1 second, then the gas is considered to be processed.

Finally, according to the variants of the method, part of the gas may undergo a specific cracking step viii. For example, this cracking may be applied either to the stream of purified thermolysis gas 32 before mixing with the gasification gas, as the cracking step viii', or to the flow of gas as a mixture of purified thermolysis gas 32 and gasification gas 21 as a cracking step viii".

In order to guarantee good overall efficiency of the method, some of the energy contained in the product gas 51 is recovered by means of an enthalpy energy recovery step v by means of a heat exchanger device that allows the exchange of heat, or even enthalpy if phenomena of condensation and recovery of latent heat take place, between the product gas 51, an enthalpy donor, and a heat-transfer medium, an enthalpy taker, which is next returned to the thermolysis step i in order to supply this step with heat. This enthalpy is necessary for thermolysis and according to the invention it advantageously corresponds to at least 35% of the enthalpy required during thermolysis in order to ensure the temperature rise and the transformation of the raw material. Preferably this enthalpy corresponds to more than 70% of the enthalpy requirement in thermolysis.

The heat transfer medium circulates in a sealed independent circuit between this heating step with the product gas and the thermolysis step.

It may be a gas or a liquid, such as molten salts or a mineral oil.

According to a variant of the invention, the enthalpy-taking medium comprises independent solid particles.

This medium will be able to have the enthalpy-contributing gas pass through it and then be added to the thermolysis chamber, where it will salt out said enthalpy. Preferentially, the independent solid particles circulate in a closed circuit between the enthalpy capture zone and the thermolysis chamber. Circulation of these particles can in particular be obtained by the action of gravity and by a transport means of the Archimedes screw or bucket conveyor type.

In this circuit, said independent solid particles are preferably tamped under the effect of their weight.

According to a preferred embodiment of the invention, the independent solid particles are spheres with a diameter of between 3 mm and 100 mm.

According to a preferred embodiment of the invention, the independent solid particles are solid bodies pierced by at least two through holes.

According to a preferred embodiment of the invention, the independent solid particles consist of a material with a thermal conductivity greater than 0.2 W/mK.

According to a preferred embodiment of the invention, the independent solid particles consist of two different materials and one of the materials constitutes the external envelope of the particle and the other material constitutes the core of the particle and has a melting point lower than that of the material constituting the external envelope.

The independent solid particle have a mass that makes it possible to accumulate enthalpy under the effect of the temperature rise and according to its specific heat capacity expressed in the unit J/(kg·K). Thus it is necessary to have a medium of great mass and/or great specific heat capacity that has high thermal inertia.

For example, the independent solid particle may be a hollow refractory molybdenum steel ball the melting point of which is above 2600° C., filled with an aluminium alloy the melting point of which is 600° C., may, at the solid-liquid phase change of the aluminium at this fixed temperature of 600° C., store more than 370 kJ/kg of aluminium, that is to say the equivalent of the sensible heat of 1 kg of aluminium heated at 400° C.

The use of independent solid particles, as described above, makes it possible transmit large quantities of energy even with small flows of product gas. According to a variant of the invention, the enthalpy-taking medium may be all or part of the purified thermolysis gas 32, which circulates in the enthalpy exchanger and is therefore heated in order then to be used as a provider of heat energy in the thermolysis step i.

At the end of this enthalpy exchange v, after dropping to a temperature below 500° C., the product gas 52 undergoes a purification step such as, for example, a final filtration by cyclones and/or bag filters. Preferably, the cooled gas 52 has a temperature below 500° C., and even more preferably below 150° C.

According to a variant of the invention, it is advantageous to separate the enthalpy recovery step v into two steps; the first provides a temperature of the gas of between 850° C. and 1050° C. so as then to cause it to undergo a nitrogen oxide capture step of the SNCR type by injection of urea, and then a second enthalpy recovery that provides the final drop in temperature.

According to the invention, the enthalpy required during the thermolysis step is provided by a return of the heat-transfer medium, but it is possible for this contribution not to suffice, in particular to ensure the desorption of volatile elements adsorbed by the char aggregates. Desorption is defined as the reverse reaction to adsorption, but also absorption, the main objective being to break the van der Waals interactions. It is then advantageous to supplement the energy requirement with an auxiliary addition that may be provided by electric heating and/or by an addition of gasification gas coming from downstream in the process.

According to a variant of the invention, the thermolysis is carried out in two separate steps, one at a temperature of between 250° C. and 350° C., and the other at a temperature of between 650° C. and 750° C. Thus each step makes it possible to produce a specific thermolysis gas that then undergoes a specific purification step iii, or conjoint if the gases are brought together before the purification. The low-temperature thermolysis step targets the elimination of the chlorinated elements, and the high-temperature thermolysis step targets the alkaline elements, the vaporisation temperature of which is around 600° C., as well as a fraction of the sulphur. In addition, the heaviest tars liable to foul the equipment will be contained in this second thermolysis gas. These gases are then advantageously subjected specifically to a tar cracking step.

According to a variant of the invention, the thermolysis step does not consist solely of heating the oxygen-depleted raw material but also proceeding with a mechanical action of disaggregation thereof so that the char produced on the surface of the raw-material elements is detached therefrom in order to accelerate the thermolysis of the lower layers and to promote the release of hydrogen, oxygen, sulphur, residual chlorine, cadmium and zinc.

According to a variant of the invention, the thermolysis step is improved by regulating the residence time of the thermolysis gases produced in the thermolysis device. It is thus advantageous to ensure that the gases produced do not reside for more than 5 seconds, or preferably not more than 3 seconds, in order to limit the redeposition thereof on raw-material elements.

According to a variant of the invention, the char and the ashes issuing from the thermolysis step i are ground or disaggregated into a powder, the particles of which have an average size of less than 0.6 mm, before subjecting them to the gasification step ii.

According to another variant, the grinding and/or disaggregation are preceded by cooling in order to make the char more friable and thus to facilitate the subsequent grinding.

According to a preferred variant of the invention, the thermolysed material 12 undergoes a desorption step before the gasification step ii. During this step the thermolysed material 12 is heated to a temperature above 950° C. and the gases are extracted specifically. This operation is similar to a supplementary thermolysis, the role of which is to guarantee the obtaining of a pure char, that is to say one containing only very little hydrogen, oxygen, nitrogen, chlorine, sulphur, potassium, zinc, cadmium and phosphorus.

According to a variant of the invention, global regulation of the method is applied, in order to optimise the reactions and to obtain a final gas that is as pure as possible.

To this end, the circulation of the carbon, hydrogen and oxygen elements, referred to as CHO elements, is analysed and regulated in various branches of the process:

The raw material is analysed before it is introduced into the process, in order to determine its equivalent C, H and O composition. For example the composition of wood chips may be simplified as $C_6H_9O_4$, that is to say the cellulose and lignin contained provide the equivalent of 6 moles of C, 9 moles of H and 4 moles of O. The moisture content thereof is also measured, since this is a source of $H_2O$ During thermolysis, CHO elements are discharged in the thermolysis gas 11. A measurement of the flow of CO, $CO_2$, $H_2$, $CH_4$ and $H_2O$ makes it possible to determine the proportion of the C H O elements that are discharged in the thermolysis gas.

The difference between the C H O elements introduced with the raw material and the C H O elements discharged in the thermolysis gas represents the C H O elements retained in the thermolysed material 12 and sent to gasification.

It is then possible to check that the thermolysis is functioning correctly and to plan the gasification reaction, in particular what quantity of gasification agent, such as water or carbon dioxide, is required. For example, if the raw material contained 100 moles of C and 70 are found in the thermolysis gas, mainly in the form of CO and $CO_2$, partially in the form of $CH_4$, then it can be deduced that 30 moles remain in the flow of thermolysed solid 12. To gasify these 30 moles into CO, it is necessary to have 30 moles of O, and therefore to introduce 30 moles of $H_2O$ as a gasification agent.

However, returning thermolysis gas through the fumes of any exothermic combustion step iv and through the direct injection of purified thermolysis gas 32 also brings $H_2O$, the flow of which must be deducted from the 30 moles mentioned above.

Then an analysis of the composition of the gasification gases 21 makes it possible to determine the proportion of C H O elements that is discharged as a gasification gas and therefore to monitor that the solid gasification residues do not contain any non-gasified carbon.

To refine the measurement, it is advantageous to monitor the flow of $H_2O$ that is discharged in the final gas 62. Thus it is possible to check that this flow is close to zero if all the reactions are balanced.

This fine monitoring of the flows of C H O elements introduced and discharged by the process thus makes it possible to predict the requirement for the specific injections of reagents such as $O_2$, $H_2O$ and $H_2$ and to monitor that the reactions are balanced.

The invention claimed is:

1. A method for producing a synthesis gas from an organic material with a moisture content of less than 20%, comprising:
    a first step of thermolysis (i) of said organic material and then a second separate step of gasification (ii) of the thermolysed organic material,
    the thermolysis step (i) is carried out by increasing the temperature of the raw material to an end temperature higher than 150° and lower than 1400° C.,
    the thermolysis step (i) is carried out in a controlled gas atmosphere in which a quantity of oxygen supplied is regulated to be less than 20% of the quantity of oxygen required for the stoichiometric combustion of the organic raw material,
    the thermolysis gas obtained during the thermolysis step (i) is sent to a step (iii) of purification of undesirable elements,
    the thermolysed material is sent to a step (ii) of endothermic gasification at a temperature above 800° C. for obtaining a gasification gas,
    the gasification gas undergoes an enthalpy recovery step (v) so that its temperature is below 500° C.,
    more than 35% of the energy necessary for the thermolysis step (i) is supplied by said enthalpy recovery step (v).

2. The method according to claim 1, wherein all or part of the purified thermolysis gas is mixed with the gasification gas upstream of the enthalpy recovery step (v).

3. The method according to claim 2, wherein all or part of said purified thermolysis gas undergoes a cracking step and is then mixed with the gasification gas upstream of the enthalpy recovery step (v).

4. The method according to claim 2, wherein all or part of said purified thermolysis gas is mixed with the gasification gas and the mixture of the purified thermolysis gas and the gasification gas then undergoes a cracking step upstream of the enthalpy recovery step (v).

5. The method according to claim 1, wherein all or part of the purified thermolysis gas undergoes the endothermic gasification step (ii).

6. The method according to claim 1, wherein all or part of the purified thermolysis gas undergoes a combustion step (iv) supplying energy to the endothermic gasification step (ii).

7. The method according to claim 1, wherein the duration and temperature of the thermolysis step (i) is regulated so as to obtain a 2S/(Cl+Na+K) molar ratio, in the thermolysed material, greater than 4 and even more preferentially greater than 8.

8. The method according to claim 1, wherein the thermolysis step (i) is carried out in two steps in series, a first thermolysis step (i') at a temperature of between 250° C. and 350° C. and a second thermolysis step (i") at a temperature of between 650° C. and 750° C., and in that the gases issuing from each of these steps (i', i") are extracted separately and undergo a conjoint or separate step (iii) of purification of the undesirable elements.

9. The method according to claim 1, wherein the purification step (iii) includes a step of purification of dust after mixing with one or more agents for collecting undesirable elements.

10. The method according to claim 1, wherein the purification step (iii) includes a condensation operation.

11. The method according to claim 1, wherein the purified thermolysis gas is used in whole or in part as a main or supplementary heat-transfer medium during the enthalpy recovery step (v).

12. The method according to claim 1, wherein independent solid particles are used wholly or partly as a main or supplementary heat-transfer medium during the enthalpy recovery step (v).

13. The method according to claim 1, wherein the quantity of the elements Cl, S, Na and K in the materials treated and/or the gases produced is analysed at step (i).

14. The method according to claim 1, wherein the quantity of the elements carbon, hydrogen and oxygen, referred to as CHO elements, in the materials treated and the gases produced is analysed at all or some of steps (i, ii iii, iv and v) of the method.

* * * * *